United States Patent
Amancherla

(10) Patent No.: US 10,423,936 B2
(45) Date of Patent: Sep. 24, 2019

(54) HIERARCHICAL ADMINISTRATION PORTAL

(71) Applicant: Quisk, Inc., Sunnyvale, CA (US)

(72) Inventor: Praveen Amancherla, Cupertino, CA (US)

(73) Assignee: QUISK, INC., Sunnyvale, CA (US)

( * ) Notice: Subject to any disclaimer, the term of this patent is extended or adjusted under 35 U.S.C. 154(b) by 416 days.

(21) Appl. No.: 14/162,114

(22) Filed: Jan. 23, 2014

(65) Prior Publication Data

US 2015/0006345 A1    Jan. 1, 2015

Related U.S. Application Data

(60) Provisional application No. 61/841,108, filed on Jun. 28, 2013.

(51) Int. Cl.
*G06Q 20/02* (2012.01)
*G06Q 20/22* (2012.01)
*G06Q 20/40* (2012.01)

(52) U.S. Cl.
CPC ......... *G06Q 20/027* (2013.01); *G06Q 20/227* (2013.01); *G06Q 20/405* (2013.01)

(58) Field of Classification Search
CPC .................................................. G06Q 40/02
USPC ......................................................... 705/30
See application file for complete search history.

(56) References Cited

U.S. PATENT DOCUMENTS

| | | | |
|---|---|---|---|
| 6,965,668 B2 | 11/2005 | Clark et al. | |
| 7,334,196 B2 | 2/2008 | Suppan et al. | |
| 7,437,437 B2 | 10/2008 | Kennedy | |
| 7,617,159 B1 * | 11/2009 | Donner | 705/67 |
| 2002/0069167 A1 | 6/2002 | Conlow | |
| 2002/0162028 A1 | 10/2002 | Kennedy | |
| 2002/0196293 A1 | 12/2002 | Suppan et al. | |

(Continued)

FOREIGN PATENT DOCUMENTS

| | | |
|---|---|---|
| CN | 1625865 A | 6/2005 |
| WO | 2012019228 A1 | 2/2012 |

OTHER PUBLICATIONS

Groupon Merchant Center, GrouponWorks, Accessed on Jun. 11, 2013, https://www.grouponworks.com/merchant-resources/merchant-center.

(Continued)

*Primary Examiner* — Cho Kwong
(74) *Attorney, Agent, or Firm* — MLO, a professional corp.

(57) ABSTRACT

A process for efficiently storing and accessing data for a payment system is described. An association is created between a payment system participant and a hierarchy node associated with a hierarchy. An association is created between a payment system data element and each node in the hierarchy. The hierarchy is stored in a first database and the second data elements are stored in a second database. A request for information is accepted from a payment system participant. The hierarchy is retrieved from the first database. The second database is traversed to obtain a set of data elements including all of the data elements located at memory locations associated with each node in a portion of the hierarchy. The set of data elements is provided in response to the request. The portion of the hierarchy traversed to obtain the data elements consists of all nodes subordinate to the hierarchy node.

14 Claims, 8 Drawing Sheets

(56) References Cited

U.S. PATENT DOCUMENTS

| | | |
|---|---|---|
| 2007/0055582 A1 | 3/2007 | Hahn-Carlson |
| 2007/0179890 A1* | 8/2007 | Sandford et al. ............... 705/44 |
| 2008/0288376 A1 | 11/2008 | Panthaki et al. |
| 2009/0024533 A1 | 1/2009 | Fernandes et al. |
| 2009/0259547 A1 | 10/2009 | Clopp |
| 2009/0259576 A1* | 10/2009 | Hahn-Carlson ................ 705/30 |
| 2009/0271275 A1 | 10/2009 | Regmi et al. |
| 2010/0042539 A1 | 2/2010 | Dheer et al. |
| 2010/0094690 A1 | 4/2010 | Beal |
| 2010/0094699 A1 | 4/2010 | Beal |
| 2011/0313837 A1 | 12/2011 | Katz et al. |
| 2012/0010940 A1 | 1/2012 | Masi |
| 2013/0036001 A1 | 2/2013 | Wegner et al. |

OTHER PUBLICATIONS

U.S. Appl. No. 13/755,421 for "Self-authenticating peer-to-peer transaction", filed Jan. 31, 2013.

International Search Report and Written Opinion dated Oct. 28, 2014 for PCT Patent Application No. PCT/US2014/043932.

Office Action dated Oct. 26, 2018 for Chinese Patent Application No. 201480036741.3.

* cited by examiner

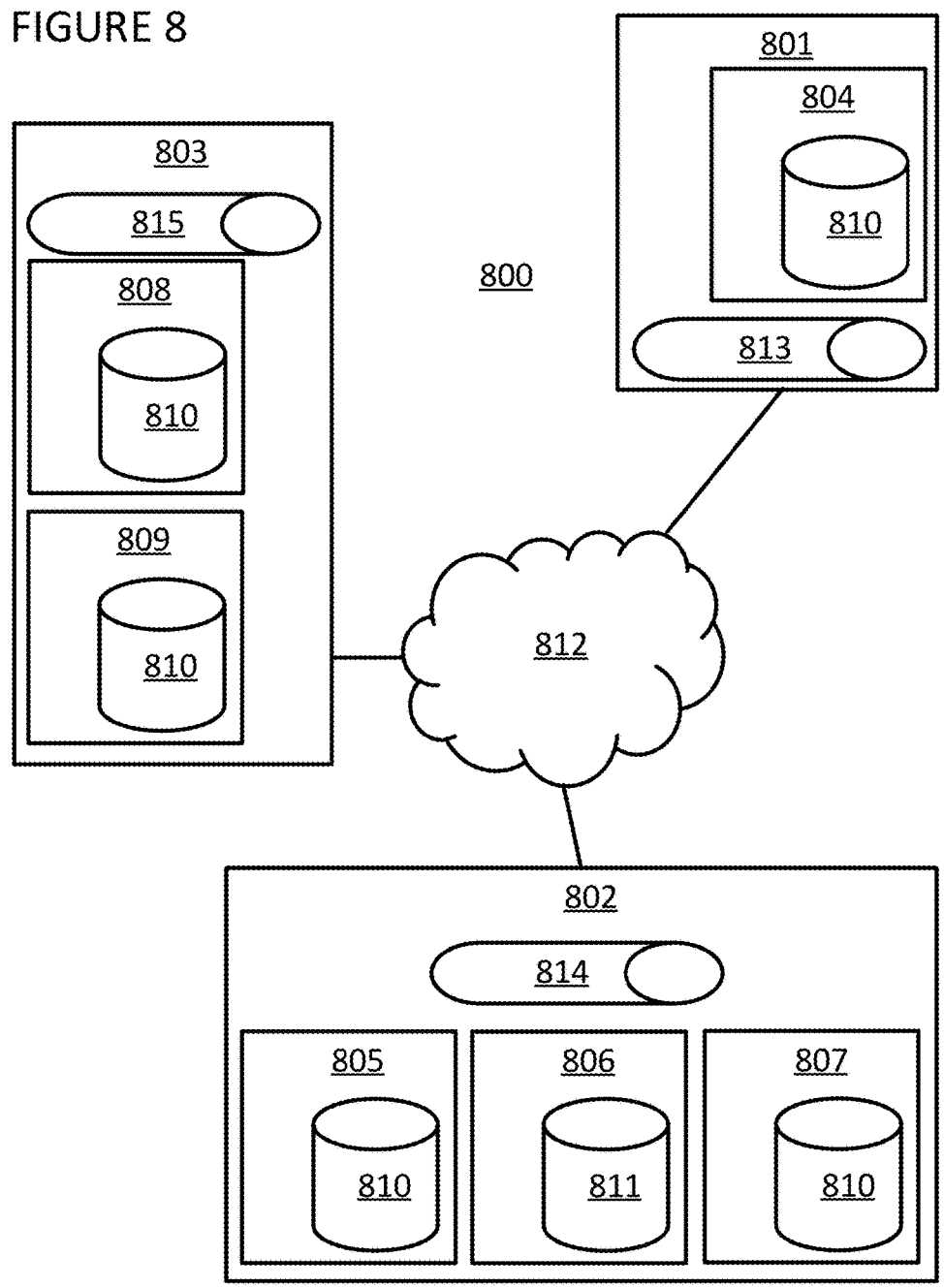

HIERARCHICAL ADMINISTRATION PORTAL

CROSS-REFERENCE TO RELATED APPLICATIONS

This application claims the benefit of U.S. Provisional Application No. 61/841,108, filed Jun. 28, 2013, the contents of which are hereby incorporated by reference.

BACKGROUND

The basic functionality of a payment service can be described with reference to system 100 shown in FIG. 1. The system 100 illustrated in FIG. 1 includes a purchaser 101 who is conducting a purchase transaction with a merchant 102. The merchant 102 and the purchaser 101 are affiliated with payment service 103. A basic example of this relationship is a credit card processing payment service 103 where the purchaser 101 is a card holder of the credit card processing payment service 103, and the merchant 102 has a merchant account with the credit card processing payment service 103. After the transaction is initiated, a processing request is sent to the payment processor 103. The payment processor 103 will then approve the transaction and administrate a settlement procedure in which funds are transferred from the user 101 to the merchant 102. The settlement procedure is administrated through communication with one or more financial institutions 104. Returning to the example of a credit card processing payment service, payment processor 103 would be the credit card network administrator and the one or more financial institutions 104 would be an issuer bank representing the purchaser 101 and an acquirer bank 104 representing the merchant 102.

The modern economy offers a wide array of different payment services and business relationships that can implement basic characteristics of the transaction described with reference to FIG. 1. The basic example of a traditional credit card network was provided above, but there are many more variations. For example, the financial institution 104 could be the financing arm of the merchant 102 and the payment processor 103 could be a payment service issuing a card to the user 101 on behalf of the merchant 102 in the form of a store-branded credit card. As another example, the financial institution 104 could also have direct relationships with both the merchant 102 and the user 101 such that the financial institution 104 will appear to be processing the transaction on behalf of the merchant 102 and the user 101 even though front-end processing of the transaction is outsourced to the payment processor 103. Numerous other arrangements exist, each with widely variant relationships between the various parties shown in system 100. The variant relationships can take the form of a hierarchy of information. From this perspective, the hierarch of the hierarchy is the entity that serves as an administrator of the system and has a direct relationship with every other entity in the system granting the administrator access to information regarding how the subordinate parties are utilizing the system.

Almost all payment processors offer their users a portal from which they can access their account. A traditional method for accessing an account was to call a customer service line associated with the payment processor, but most payment processors have shifted towards using a web-enabled user interface as the main point of access for account holders. The users can log into these portals using self-identifying credentials and make payments to their accounts, check their balances, initiate transfers to other accounts, and perform various other functions. Payment services generally also provide merchants with online portals from which they can access their merchant accounts.

SUMMARY

Disclosed herein are systems, methods, and computer-readable media for a hierarchical administration portal for a payment system. The systems can perform the described methods and can be stored on the computer-readable media.

A computer-implemented method of providing hierarchical administration comprises creating a first association between a payment system participant and a hierarchy node. The hierarchy node is associated with a level of a hierarchy. The method also comprises creating a second association between a set of payment system data elements and a set of nodes in the hierarchy. The method also comprises storing the hierarchy in a first database. The method also comprises accepting a request for information from the payment system participant via a user interface. The method also comprises retrieving the hierarchy from the first database. The method also comprises traversing the second database to obtain a subset of the set of payment system data elements consisting of the payment system data elements in the set of payment system data elements that are located at memory locations associated with each node in a portion of the hierarchy. The method also comprises providing the subset of the set of payment system data elements to the payment system participant as a response to the request for information. The portion of the hierarchy consists of each node in the hierarchy that is subordinate to the hierarchy node.

Another computer-implemented method of providing hierarchical administration for a payment service comprises creating a payment service hierarchy for the payment service. The payment service hierarchy is created by creating hierarchy nodes of the payment service hierarchy. Each hierarchy node is associated with a payment service participant of the payment service. The payment service hierarchy is also created by creating hierarchy branch associations of the payment service hierarchy. Each hierarchy branch association associates a superordinate node of the hierarchy nodes to a subordinate node of the hierarchy nodes. A first set of access rights to payment service information granted to a first payment service participant associated with the superordinate node is a superset of a second set of access rights to the payment service information granted to a second payment service participant associated with the subordinate node. The payment service hierarchy is also created by storing the hierarchy nodes and the hierarchy branch associations in a database. The method also comprises determining whether the first payment service participant is authorized to access the requested information upon receiving a request for information from the first payment service participant associated with the superordinate node. The authorization is determined by traversing a subtree of the hierarchy nodes where the superordinate node is a hierarch of the subtree. The authorization is also determined by retrieving a set of access rights associated with the hierarchy node of the subtree for each hierarchy node of the subtree that is traversed. The authorization is also determined by evaluating the set of access rights for each hierarchy node of the subtree that is traversed. The method also comprises responding to the request by granting access to the requested information if the first payment service participant is authorized to access the requested information.

Another computer-implemented method of providing hierarchical administration comprises creating a first association between a payment system participant and a hierarchy node. The hierarchy node is associated with a level of a hierarchy. The hierarchy node is subordinate to a hierarch of the hierarchy. The method also comprises creating a second association between a set of payment system data elements and a set of nodes in the hierarchy. The method also comprises providing a user interface to the payment system participant. The user interface includes an account portal having controls for administrating an account of the payment system participant, and displays a subset of the set of payment system data elements in accordance with a number of payment system data element filters displayed on the user interface. The number of payment system data element filters displayed on the user interface is inversely related to a number of levels between the level and a level of the hierarch.

BRIEF DESCRIPTION OF DRAWINGS

FIG. 5 is an example of a web portal transaction summary report for a financial network in accordance with an embodiment.

FIG. 8 shows a distributed storage architecture of an exemplary payment system.

DETAILED DESCRIPTION

Reference now will be made in detail to one or more embodiments, one or more examples of which are illustrated in the accompanying drawings. Each example is provided by way of explanation of the present technology, not as a limitation of the present technology. In fact, it will be apparent to those skilled in the art that modifications and variations can be made in the present technology without departing from the spirit and scope thereof. For instance, features illustrated or described as part of one embodiment may be used with another embodiment to yield a still further embodiment. Thus, it is intended that the present subject matter covers all such modifications and variations within the scope of the appended claims and their equivalents.

Complex payment services can run into difficulty because they need to offer many different kinds of portals to the various participants in the payment service. In the example of a payment service that enables a bank to appear to offer a web based payment service under the bank's branding, the payment service provides a portal to the bank, a portal for the merchant on behalf of the bank, and a portal for the purchaser on behalf of the bank. Each of these portals need access to different portions of the data held by the payment processing system and need to use widely variant logic to obtain that data from the processing system. The payment service will also generally have to provide the financial institution with a portal on which to manage its branded payment system.

The disclosure relates generally to network-based payment systems, and more specifically to portals for administrating network-based payment systems. Embodiments provide for a uniform method of providing account access and account data to various participants in a payment service in an efficient manner by leveraging an inherent hierarchical structure of all payment services regardless of the business relationships upon which the payment service is based. Embodiments store data in association with a hierarchy of the payment service that is also stored in data by the payment service. These embodiments involve a method of building out the hierarchy as new participants are added to the payment service and associating each additional participant with a particular node in the hierarchy.

Figure 1:
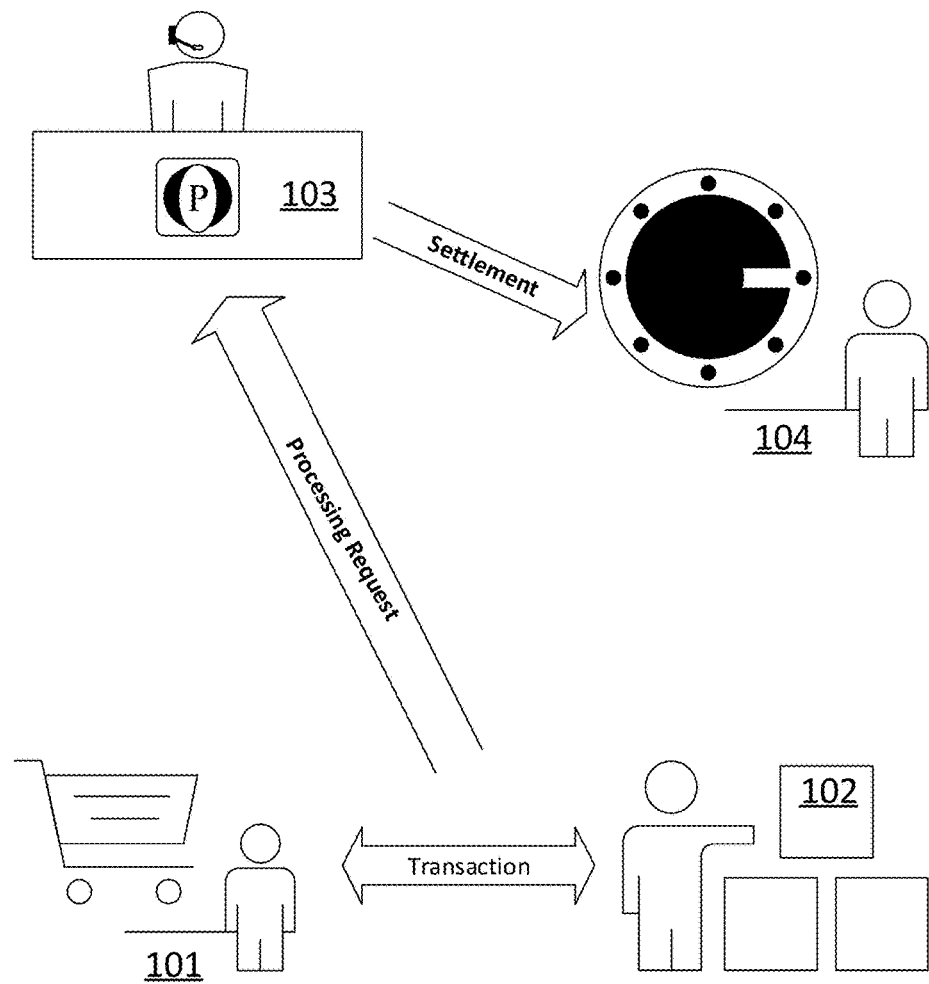
FIG. 1 illustrates a block diagram of a system for processing and settling purchase transactions that is in accordance with the related art.
Figure 2:
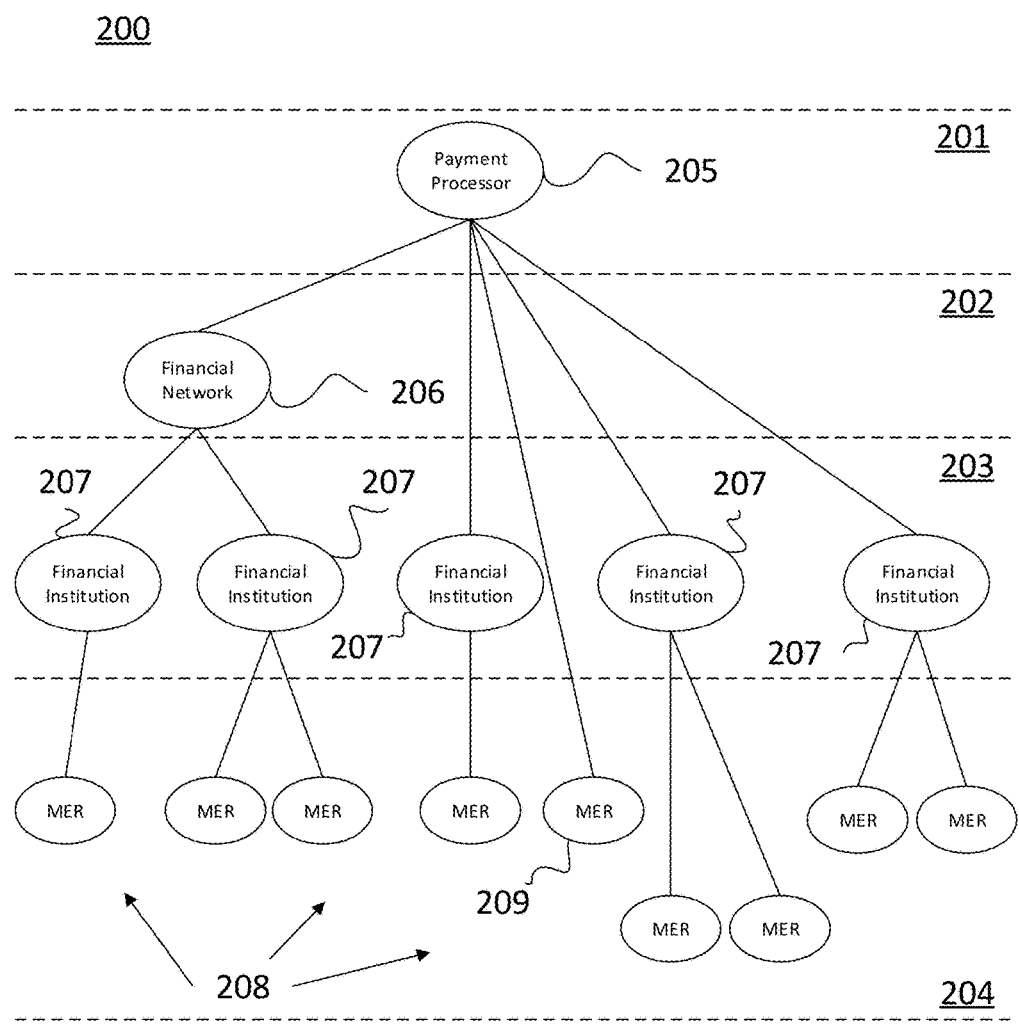
FIG. 2 illustrates a block diagram of a payment service hierarchy in accordance with an embodiment.

FIG. 2 illustrates a payment service hierarchy 200 comprising four levels: 201, 202, 203, and 204. Each of the ovals in FIG. 2 represents a node in the hierarchy 200 and each line represents a branch in the hierarchy. Not all branches in the hierarchy 200 link nodes in neighboring ranks. As seen in hierarchy 200, a payment processor 205 is directly connected to nodes in the level 203 and is also directly connected to a merchant 209 in the level 204. Any of the nodes in the hierarchy 200 can be associated with an administrator that will manage how the entity represented by the node utilizes the payment service.

The hierarch of the hierarchy 200 is a payment processor 205. As the hierarch, the payment processor 205 is the only member of the highest rank (i.e., level 201). The payment processor 205 can take on various responsibilities for the overall payment service, in particular all transaction requests in the system are routed through the payment processor 205. Thus, all accounts within the payment service can be accessible to the payment processor 205. As an example, the payment processor 205 could be providing a payment service that allows its account holders to initiate a transfer of funds between financial network 206 and financial institutions 207 to effect transactions between themselves and merchants 208. In some approaches, the payment processor 205 is not necessarily in control of the overall payment service—other members such as the financial network 206 may technically be the administrator of the overall system. However, the payment processor 205 is nonetheless the hierarch because it requires access to more information regarding accounts (e.g., authentication, authorization, balances, and settings) and transactions in the payment system than any other entity associated with the payment service.

The remaining three ranks in the hierarchy 200 can include a financial institution network level 202, a financial institution level 203, and a merchant level 204. As illustrated in FIG. 2, the financial institution network level can consist of a single financial network 206. However, many financial networks can exist in, or be associated with, the financial institution network level 202.

Although not shown in FIG. 2, the hierarchy 200 could further include one or more additional levels. The additional levels could be interspersed between the levels 201-204 that are displayed. The additional levels 201-204 could likewise be added below the levels that are displayed. The additional levels can represent financial networks and merchants in gradually more specific geographical locations. For example, a relatively large financial institution or merchant might require multiple levels of hierarchy in its own right (i.e., a large bank could have an entry at a financial-institution level and another set of entries at a financial-institution-by-country level). Not every entity in the hierarchy 200 would need to be organized in this manner, so certain entities might only have a single entry in their strata of the hierarchy while others may occupy every level in their strata of the hierarchy. Finally, although the levels in the hierarchy 200 are shown as containing a homogeneous group of payment system participants, multiple types of participants could occupy a single level, and multiple types of participants could be mixed together in a given stratum. In one approach, account holders could occupy the same stratum as the financial institutions. This approach would be beneficial because the individual users may need to have access to payments processed by the payment processor on their behalf across numerous possible merchants that are all part of the payment system regardless of which financial institution manages the accounts of the merchant. A node representing an individual consumer account holder of the payment system can also be associated with an administrator in the sense that an individual accesses their account with the payment service to administrate their own account.

The branches in the hierarchy 200 can represent a particular relationship between the nodes in that access to the payment service is facilitated along each branch from the dominant node to the subordinate node. For example, a financial institution in level 203 that is connected by a branch to a merchant in level 204 is providing access to the payment service to that merchant. The merchants may therefore consider the payment service to be a service provided by the financial institution and not a service provided by the payment processor 205. In this example, the merchant can have a financial account with the financial institution and the merchant's access to the payment service can be branded with identifiers for the financial institution. Furthermore, a portal the merchant uses to access the payment service can be branded using the trademarks of the financial institution to which the merchant is connected in the hierarchy 200. This type of relationship can be reflected in each branch of the hierarchy 200. The financial network 206 can create one or more relationships necessary for its subordinate financial institutions to be members of the payment service. The financial institutions further provide the relationship necessary for their subordinate merchants to be members of the payment service.

A hierarchy of a payment service such as the one displayed in FIG. 2 helps the payment service realize several benefits. Since each node in the hierarchy can have access to transaction data and account data for members of the hierarchy that are subordinate to that node, the hierarchy provides a convenient way to organize and access the data required by each node. Since an administrator associated with each node generally only needs to be provided with access to information regarding the account of its own node and those nodes subordinate to it, the hierarchy defines how the data associated with that node can be accessed. If a traditional lookup table were used to access the same data, it would take considerable time to search for all the information needed by a particular node. Using a lookup table requires an automated search of each merchant in the system to determine their associated financial institution, querying the discovered subset of merchants for the relevant data, and repeating the same process for each user. Instead, the hierarchy already provides the required set of merchants and further provides the required subset of users once the merchant nodes have been traversed. Although the participants associated with each node in the hierarchy may require access to a different set of data and need access to different services in order to properly administer their accounts, the hierarchy provides a convenient way to serve that participant the data they need through an account portal. Since each node will access the data in a similar way, the underlying architecture for an account management portal can be made consistent throughout the payment service for all of the associated participants regardless of the underlying business structure of the payment service.

Administrative access can be granted to an administrator at any level in the hierarchy, and varying levels of access can be granted to the administrator. In one example, the system can be configured to allow an administrator to have access to all the data across all the entities at any lower level in the hierarchy, but not at sibling or parent levels. Thus, an administrator of "Bank 1", a financial institution 207 at the financial institution level 203, can access customer data, transaction data, campaigns, and other information of all merchants and stores associated with Bank 1, but cannot access data of any other bank or at Bank 1's network at the financial institution network level 202. The administrator would likewise not be able to access data at the payment service level 201. In another example, the system can be configured to allow the administrator to have access to all the data across the entities at any lower level in the hierarchy as well as its own level—the administrator can access all or partial information belonging to its "siblings", but not descendants of the siblings. Thus, the administrator of "Bank 1" can see (1) its own information, (2) all or a configurable limited amount of information of other financial institutions 207 at the financial institution 203 level, and (3) information of its descendants.

Figure 3:
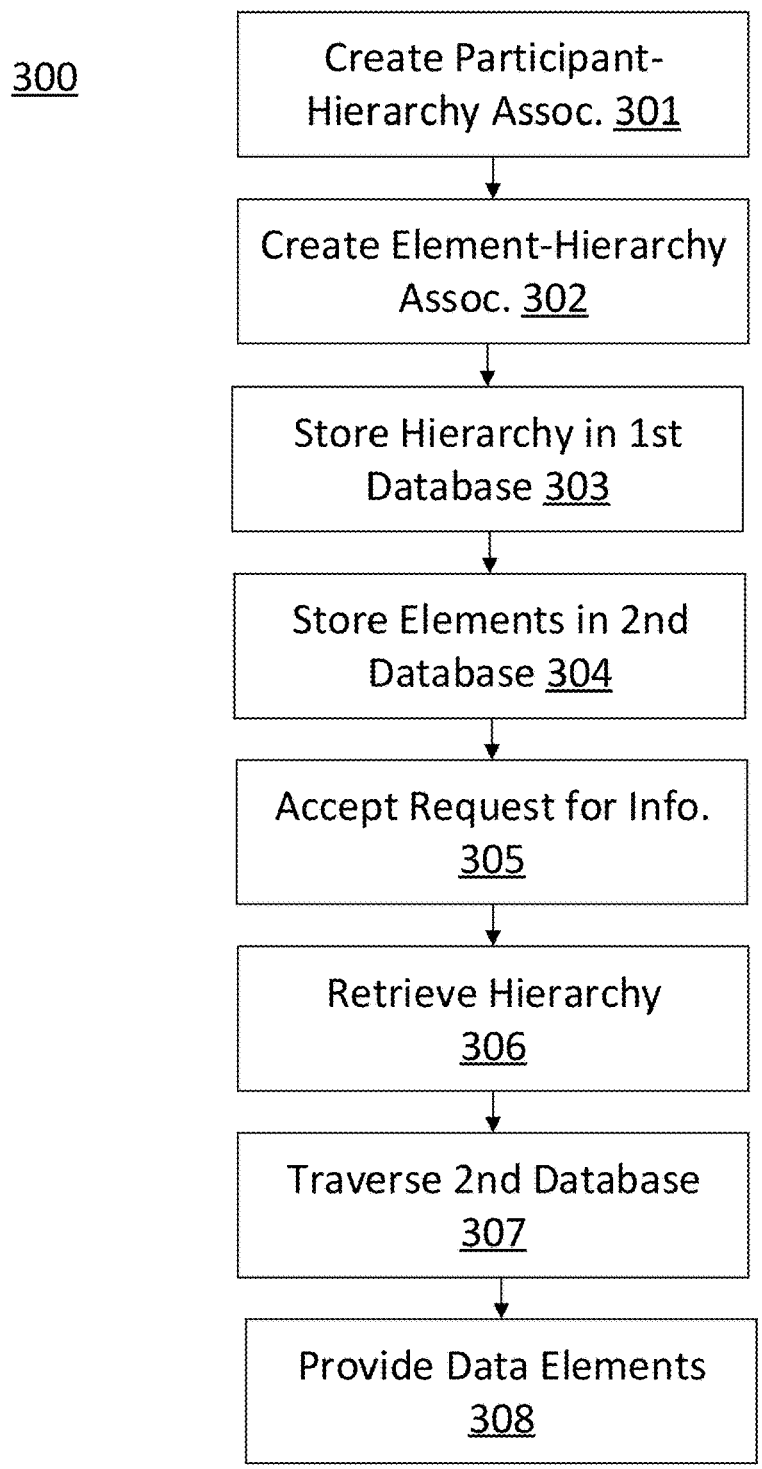
FIG. 3 illustrates a flow chart of a method for providing information to participants in a payment service in accordance with an embodiment.

FIG. 3 displays a method 300 for providing access to a payment service to multiple participants. The method 300 depends on the availability of a hierarchy such as hierarchy 200, and therefore begins with step 301 in which a participant is associated with a hierarchy node. The node uniquely identifies a level of the hierarchy and a branch of the hierarchy. In specific embodiments, the payment service may create the hierarchy as participants in the payment service are on-boarded. For example, a financial institution wishing to provide a payment service to the merchants and consumers that bank with the financial institution will be assigned to a specific level in the hierarchy as part of the setup, onboarding, or registration procedure for becoming part of the service. The process could also include associating each of the merchants and other account holders of the financial institution with a node in the hierarchy. These account holders would be subordinate to the financial institution in the hierarchy. Step 301 can be repeated any number of times to fill out the hierarchy, and it may also be repeated continuously as the payment service is in operation to accommodate new members of the payment service. Once a participant has been associated with a node in the hierarchy, an administrator can be created for that participant so that the system can track which level of the hierarchy the administrator is associated with.

The method 300 continues with step 302 in which an association is created between a payment system data element and each node in the hierarchy. Data elements can take on various forms but generally relate to the transactions taking place within the payment system and the accounts held by participants in the payment service. For example, the data elements could be a description of a transaction conducted by a participant and identify (i) the type of transaction such as whether it is a sale or some other kind of transaction, (ii) an account number of a recipient, (iii) an amount transferred or requested to be transferred, (iv) the date and/or time of the transaction, etc. The data element could be associated with a node representing the recipient, the sender, or any financial institution that the recipient and/or the sender are subordinate to. This could result in the data element being associated with two different financial institutions. The data element could also contain information about a loyalty program (such as a rewards program) offered by a merchant in the payment service, a balance of fees owed from a merchant or financial institution to the payment service, or any other information regarding the relationship between a participant in the payment service and the payment service.

The method 300 continues with steps 303 and 304 in which the hierarchy is stored in a first database and the data elements are stored in a second database. The two databases may be present on the same physical storage device, or they may be stored on different physical storage devices. If the two databases are stored on different physical storage devices, the different physical storage devices can allow concurrent reads from and writes to the two databases so as to increase high volume processing capabilities of the system. The databases can be administrated by the payment service. The data elements may be tagged with the node in the hierarchy to which they were associated in step 302 and stored with that tag in place. The data elements may also be stored at addresses in the database that correlate to the manner in which they are associated in the step 302 such that a root address identifies the data elements associated with one node in the hierarchy and subordinate nodes in the hierarchy are stored at specific addresses that share the aforementioned root address. The general manner in which the data elements are stored allows the payment service to logically aggregate the data based on the hierarchy 200 or certain hierarchies that comprise the hierarchy 200.

The method 300 continues with step 305 in which a request is accepted from a user for information from the payment system via a user interface. For example, the user may click on a button in a web portal designed for an administrator of one of the nodes in the hierarchy 200. The button could be a "display detailed transactions" button used by the merchant that will display details of all the transactions conducted to purchase items at the merchant using the payment service. The button could also be a "rewards program status" button used by the merchant that compares sales made using the payment service in a period of time prior to offering an incentive program for the payment service to sales made using the payment service after offering the incentive program. The user interface could also be a text prompt or pull down menu that allows an administrator to receive other types of payment service related data from the payment service database.

The method 300 continues with steps 306 and 307 in which the required data elements are provided to the administrator. In step 306, the hierarchy is retrieved from the first database to be used in step 307 to traverse the second database. In step 307, the second database is traversed to obtain the data elements requested by the administrator. The second database is traversed based on the hierarchy by only traversing the nodes that are subordinate to the hierarchy node associated with the administrator. As a result, the time needed to traverse the second database is limited to a significant extent. Since the administrator should only have access to data elements associated with nodes that are subordinate to its own hierarchy node, the search for relevant data is efficiently limited to the places where that data is likely to be.

Traversal can be made more efficient by further limiting a number of nodes traversed. Not every portion of the hierarchy that is subordinate to the requester needs to be traversed. Indeed, certain information queries that are sent to the system will filter the request by particular subordinates such that the portion of the hierarchy that needs to be traversed is further limited based on the user's request. For example, a payment service level administrator could filter an information request to a particular financial network, a particular financial institution, or even a particular account holder. In like fashion, any lower level administrator in the system can filter their request to a limited subset of their subordinates.

Not every data element associated with the subordinate nodes needs to be obtained. As an example, a detailed transactions request conducted by a financial institution would not require a return of the account balances of that financial institution's merchant accounts. However, this is true regardless of how the database was traversed and does not diminish the fact that the methods described above improve the efficiency of the data collection process in the first instance. Still, the efficiency of the system can be improved in this regard by limiting the data elements that are available at each node based on the role of the administrator in the payment service. For example, a financial institution that only offered access to the payment service as an inducement for keeping an account with the financial institution, but that did not settle transactions associated with the account, might not need access to the balance of the merchant and consumer account holders that were subordinate to the financial institution in the hierarchy. As a result, step 307 could be conducted on behalf of the financial institution targeting a limited set of the data elements associated with each subordinate hierarchy node which would provide even greater advantages in terms of the amount of time and resources while introducing no decrease in the functionality of the payment service.

The method 300 continues with step 308 in which data elements are provided to the administrator in response to the request in step 305. The data elements will be the data elements found when traversing the second database in step 307 in response to the request in step 305. The data elements may be presented in tabular format. The data elements may also be provided to the user to a format that can be exported from the web portal for analysis by a spreadsheet program or presented to provide for a collaborative discussion of the payment service performance for the administrator. The data elements may also be exported to interface with the internal administration software of the entity associated with the hierarchy node. For example, the internal book keeping processes for a financial institution could take in the data elements in this format in order for the financial institution to include usage of the payment service as a portion of an integrated account statement for their account holders.

Figure 4:
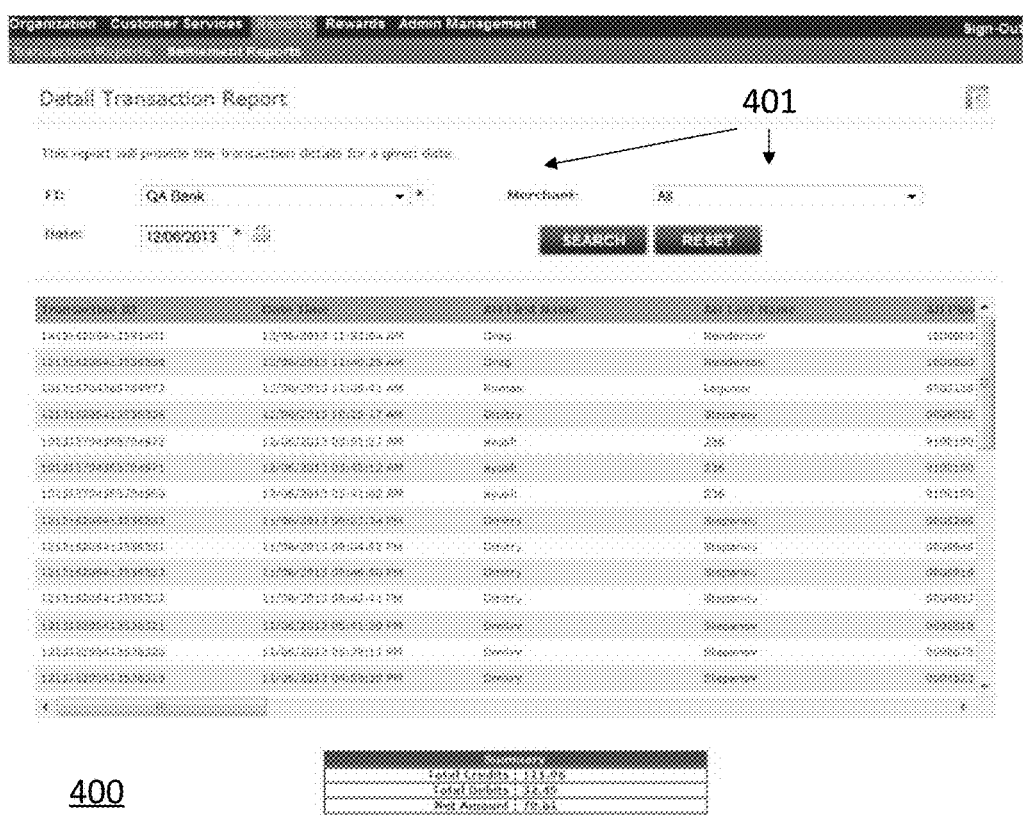
FIG. 4 is an example of a web portal transaction summary report for a payment service provider in accordance with an embodiment.
Figure 5:
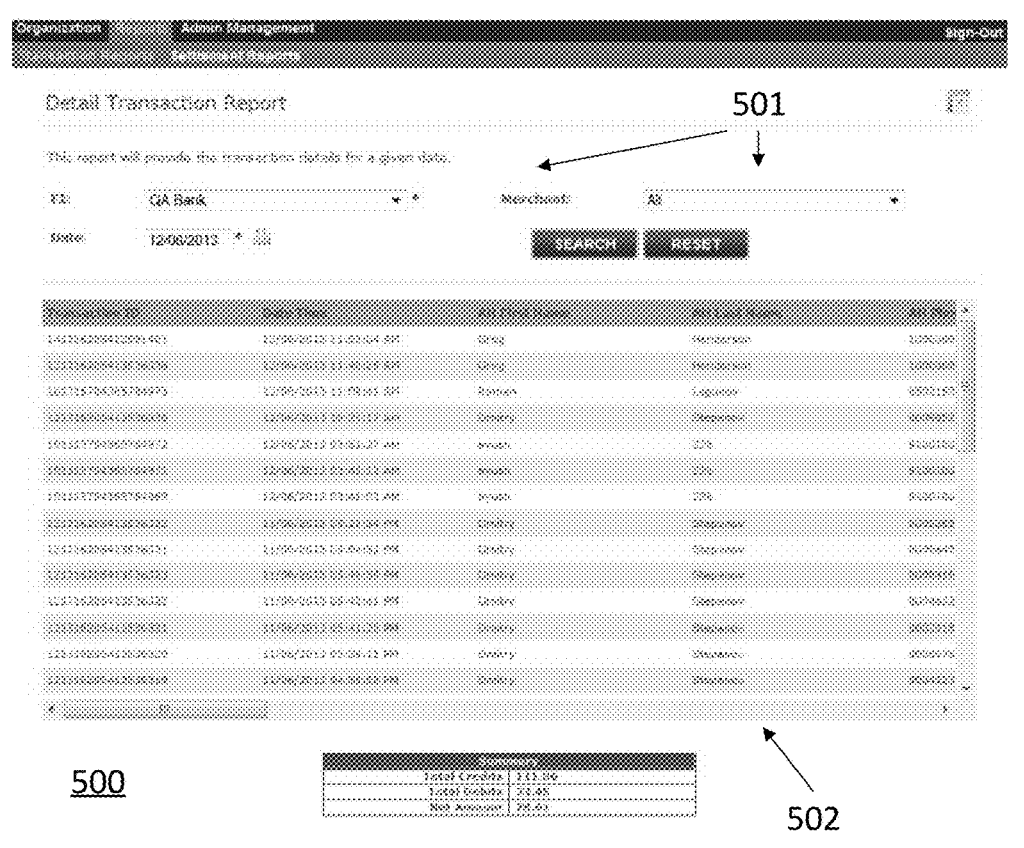
Figure 6:
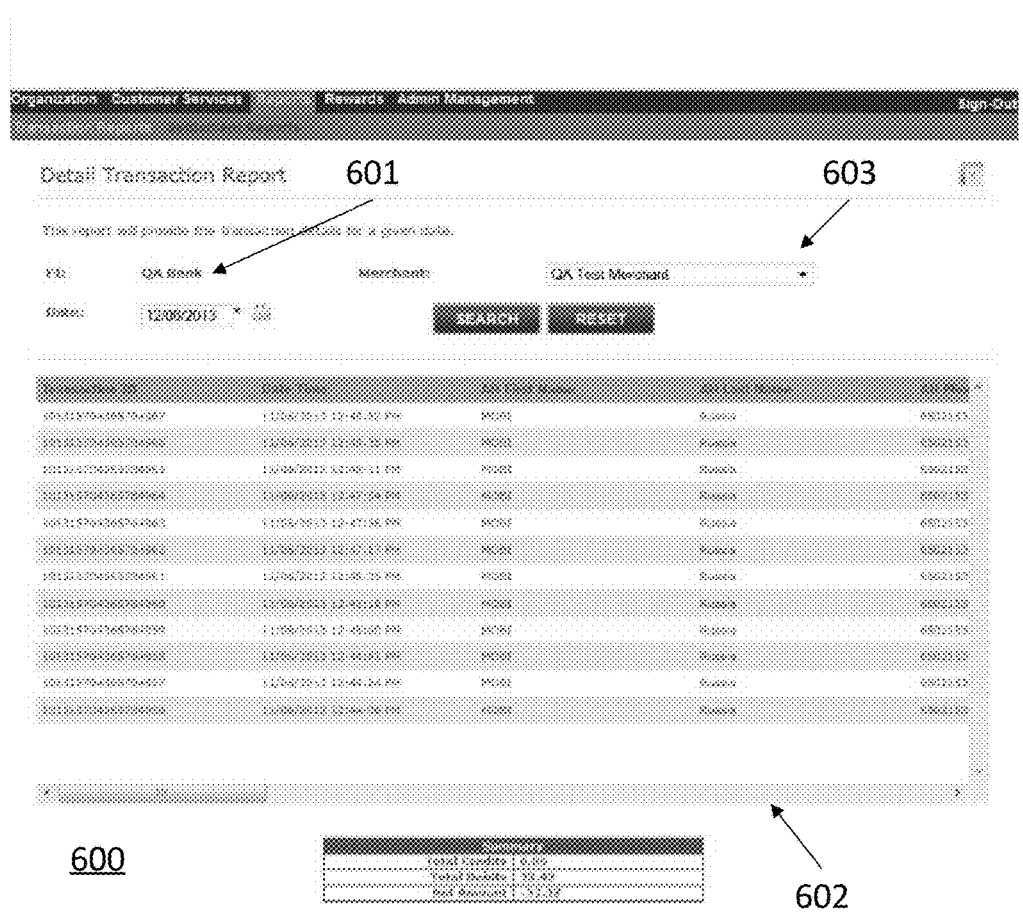
FIG. 6 is an example of a web portal transaction summary report for a financial institution in accordance with an embodiment.
Figure 7:
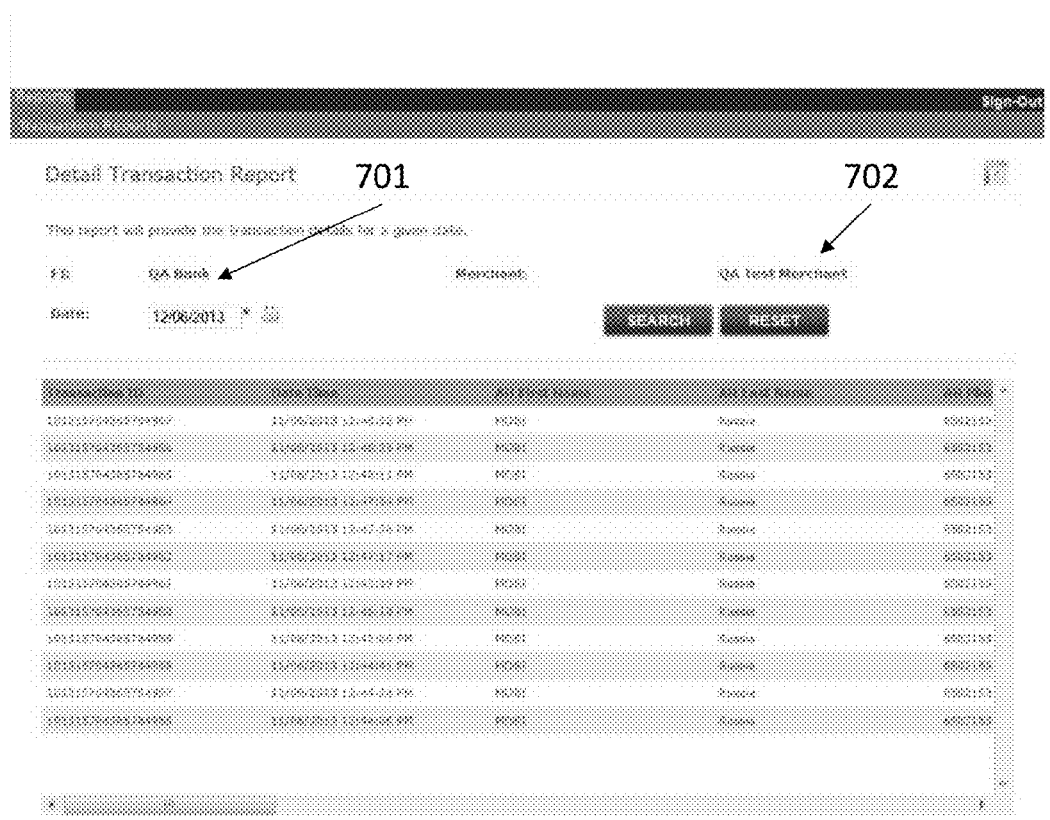
FIG. 7 is an example of a web portal transaction summary report for a merchant account in accordance with an embodiment.

FIGS. 4-7 show exemplary screenshots of detailed transaction reports that can be provided to administrators in step 308. FIG. 4 shows a web portal detailed transaction report 400 for a payment service level administrator. The report can include all transactions conducted in the payment service subject to specific filters. Filters 401 are provided towards the top of the screen where the payment service level administrator is able to filter the results 402 by financial institution ("FI") and merchant ("Merchant"). These filters can be used to limit the data request to a limited subset of subordinate nodes in the hierarchy. FIG. 5 shows a web portal detailed transaction report for a financial network 500. This report can include all transactions that involved parties associated with subordinate nodes to the financial network. Just as with the payment service level administrator report, filters 501 are provide to filter the results 502 to a specific subset of subordinate nodes in the hierarchy. FIG. 6 shows a web portal detailed transaction report for a specific financial institution 600. Notably, the portal contains many of the same elements as the portal for the financial network, but the filter FI associated with the financial institution is not available, and is instead replaced with a static indicator of the FI's identity 601, because the financial institution does not have access to information regarding transactions that were conducted with other financial institutions to which its own account holders were not counter parties. The area of the portal is still utilized to provide context to the administrator of the specific financial institution through static indicator 601, but the financial institution is only able to filter results 602 by its own subordinates which are merchants in FIG. 6. Filter 603 is therefore still available as a pull down menu in portal 600. FIG. 7 shows a web portal detailed transaction report for a merchant 700. The displayed merchant account is not able to filter results by subordinates as both the FI and merchant filers are now replaced with static indicators 701 and 702. These static indicators still provide context for an administrator of the merchant as the merchant's financial institution and the name of the merchant are present in the space where filters would have otherwise been modifiable.

FIG. 8 shows a distributed storage architecture 800 of an exemplary payment system of a payment service. The payment system utilizes the distributed storage architecture 800 to provide low latency processing and redundancy across any geographic area. The payment system can operate across a geographic area with three locations 801, 802, and 803. At the location 801, a single payment service participant, a financial network 804, can operate (i.e., the financial network 804 can have one or more computing nodes at the location 801). At location 802, a payment processor 805, a financial institution 806, and a merchant 807 can operate (i.e., the payment processor 805, the financial institution 806, and the merchant 807 can each have one or more computing nodes at location 802). At the location 803, two merchants 808 and 809 can operate (i.e., the two merchants can each have one or more computing nodes at the location 803). Any payment service participant can also have operations at more than one location (e.g., a merchant can have operations at location 802 and at the location 803 as illustrated). Each location can also have one or more additional operating nodes (not illustrated) that may be related or unrelated to the payment service.

Each payment service participant can store its own data elements 810, i.e., those data elements that are associated directly with the payment service participant, in a local cache of data elements. The local cache of data elements can be considered a second storage device and can include one or more physical storage devices. For example, the financial institution 806 at location 802 can be a bank that stores all transaction, ledger, account, and other bank information in its corresponding local cache of data elements 811. Thus, the stores of data elements managed by each payment service participant can be siloed from other stores of data elements. Though not illustrated, the data elements can also be stored remote from a payment service participant, for example, the bank can remotely access its data elements. Regardless of where the data elements for a payment service participant are physically stored, it is generally understood that the payment service participant can have a greater degree of control over its data elements than other payment service participants—therefore, the payment service participants may desire to have their data elements stored physically closer to their operations.

Nodes at the locations 801-03 can communicate to each other through a network 812, such as the Internet or a wide area network (WAN). Though not illustrated, the network can connect to a central repository of the payment service. Though not illustrated, it is assumed that each location can have a network infrastructure that allows nodes at the location to communicate with other nodes without having to traverse a potentially higher latency network that spans multiple locations. For example, if location 801 is a metropolitan area, location 801 can utilize a metropolitan area network (MAN), if location 802 is an area with large spatial scope, location 802 can utilize a wide area network (WAN), and if location 803 is a college campus, location 803 can utilize a campus area network (CAN) or other local area network (LAN).

The payment system can reduce latency by caching stored hierarchies storing hierarchy data at the various locations. As illustrated, location 801 has a cached hierarchy 813, location 802 has a cached hierarchy 814, and location 803 has a cached hierarchy 815. Each of the cached hierarchies can be examples of a first storage device, though a storage device can include one or more physical machines. Each of the cached hierarchies can reduce data access latency by serving the cached hierarchy's location. For example, all payment service participants at location 801 can access the cached hierarchy 813, all payment service participants at location 802 can access the cached hierarchy 814, and all payment service participants at location 803 can access the cached hierarchy 815, rather than having to access hierarchy data across the network. The cached hierarchies 813-15 can be stored in any logical storage system such as an in-memory NoSQL database, a memory caching system such as memcached, or any other logical storage system that allows fast data access.

Hierarchy data stored in each of the cached hierarchies 813-15 can include complete or partial hierarchy data of the payment system. Partial hierarchy data can include only the subtrees relevant to the payment service participants at the corresponding location to the cached hierarchy, thereby decreasing data access time, data synchronization time, and redundancy. Complete hierarchy data can include an entire hierarchy of the payment service at the corresponding location to the cached hierarchy, thereby increasing data access time, data synchronization time, and redundancy. A cached hierarchy with complete hierarchy data can also be dynamically assigned based, for example, on centralization (e.g., minimizing average anticipated latency), and thus potentially eliminate the need for a static central repository of the payment service hierarchy.

Because hierarchy data includes hierarchical data of payment service participants, the hierarchies are unlikely to change frequently. Changes in the hierarchies are generally effected when a new payment service participant joins the payment service (add), an existing payment service participant leaves the payment service (delete), and when the internal hierarchy shifts (shift). These events occur infrequently relative to the number of transactions occurring within the payment system 800. Accordingly, the cached hierarchies can be stored in a directory service, such as an X.500 directory service and/or an LDAP-based directory service. LDAP implementations are lightweight and particularly well-suited for hierarchies that are primarily read and not frequently written. Directory services can also provide simple configuration and synchronization of hierarchical structures such as trees and other directed acyclic graph structures that may embody the hierarchy or sub-hierarchies.

Because each cached hierarchy is stored at a location with payment service participants access the hierarchy data, latency is decreased when using the cached hierarchy. Further, because a payment service participant is also likely to locally store data elements, the total query time for traversing a hierarchy to retrieve data elements can be significantly decreased. For example, an administrator of the financial network 804 at location 801 who attempts to retrieve all transactions by customers of the merchants 808 and 809 at location 803 using the financial institution 806 at location 802 can quickly look up the cached hierarchy 813 to limit the number of queries that much cross the network to those queries for data elements of the financial institution 806 at location 802 and/or data elements of the merchants 808 and 809 at location 803. As another example, an administrator of the financial institution 806 at location 802 who attempts to retrieve all transactions by customers of the merchant at location 802 using the financial institution at location 802 can query the cache hierarchy 814 to retrieve data elements all stored at location 802, and the query will never have to cross the network. Because the cached hierarchies can also include metadata of the locations of various data elements, the cached hierarchies can be used in conjunction with a query optimizer that quickly determines a low latency query, e.g., a query that reduces the number of cross-network access requests.

Although one or more embodiments are described, other variations are possible. Various configurations of the described system(s) may be used in place of, or in addition to, the configurations presented herein without departing from the spirit and scope of the disclosure. Those skilled in the art will appreciate that the foregoing disclosure is by way of example only, and does not necessarily limit the invention. For example, nothing in the disclosure should be read to limit the payment system to one that processes credit cards as any form of electronic payments system could potentially benefit from the teachings of the disclosure. In particular, the server(s) that process(es) the payment transactions could be similar to a MOBI account server, described in U.S. Patent Publication No. 2009/0024533 A1 for "Payment Systems and Methods" filed Aug. 29, 2007, or U.S. patent application Ser. No. 13/755,421 for "Self-authenticating peer-to-peer transaction" filed Jan. 31, 2013, both of which are owned by the assignee of the present invention, and both of which are incorporated by reference herein in their entirety. The payment processor could be a MOBI system. In general, any figures presented are only intended to indicate one possible configuration, and many variations are possible. Those skilled in the art will also appreciate that methods and systems consistent with the disclosure are suitable for use in a wide range of applications encompassing any related hierarchical payment processing service.

While the specification has been described in detail with respect to specific embodiments of the invention, it will be appreciated that those skilled in the art, upon attaining an understanding of the foregoing, may readily conceive of alterations to, variations of, and equivalents to these embodiments. Accordingly, the invention can be implemented in numerous ways, including as an apparatus, a system, a device, a computer-implemented method, and/or a computer-readable medium such as a non-transitory computer-readable storage medium with computer-readable instructions or other program code, which when executed by one or more processors, cause a computer to perform a method in accordance with the one or more embodiments. Examples of a medium includes, but is not limited to, circuit-based media (e.g., read-only memory, flash memory, solid-state drive), magnetic media (e.g., hard drive, tape, floppy disk, magstripe card), optical media (e.g., compact disc, digital versatile disc, Blu-ray Disc), and any combination of such media. An example of a system is a computer-based system with one or more processors executing instructions on one or more network-attached nodes. A processor can be any hardware-based processing device including, but not limited to, a central processing unit with one or more cores, a reduced-instruction set processor, a field-programmable gate array, a general purpose graphics processing unit, and any combination of such processing devices. A network can run over any physical communications medium, including, but not limited to, Ethernet, WiFi, infrared, universal serial bus, optical fiber, Bluetooth, telephone network, bus interfaces, and any combination of such physical communications media. It should be appreciated that the exact implementation is not limited to any single particular hardware configuration. These and other modifications and variations to the present invention may be practiced by those skilled in the art, without departing from the spirit and scope of the present invention, which is more particularly set forth in the appended claims.

What is claimed is:

1. A computer-implemented method of providing hierarchical administration, comprising:
   creating a first association between a payment system participant and a hierarchy node, the hierarchy node being associated with a level of a hierarchy;
   creating a second association between a set of payment system data elements and a set of nodes in the hierarchy;
   storing the hierarchy in a first database, the hierarchy including hierarchy data stored in a changeable format;
   storing the set of payment system data elements in a second database separate from the first database, the payment system data elements including transaction data showing transactions that have taken place within a payment system;
   accepting a request for information from the payment system participant via a user interface;
   retrieving the hierarchy from the first database;
   using the retrieved hierarchy to traverse the second database to obtain a subset of the set of payment system data elements consisting of the payment system data elements in the set of payment system data elements that are located at memory locations associated with each node in a portion of the hierarchy; and
   providing the subset of the set of payment system data elements to the payment system participant as a response to the request for information;
   wherein the portion of the hierarchy consists of each node in the hierarchy that is subordinate to the hierarchy node as indicated by the retrieved hierarchy and excludes each node in the hierarchy that is not subordinate to the hierarchy node as indicated by the retrieved hierarchy.

2. The computer-implemented method of claim 1, wherein:
   the payment system participant is a payment system operator, and
   the hierarchy node is a hierarch of the hierarchy.

3. The computer-implemented method of claim 1, wherein:
the first database is stored on a first physical storage device, and
the second database is stored on a second physical storage device that is physically separate from the first physical storage device so as to allow concurrent reads from and writes to the first database and the second database.

4. The computer-implemented method of claim 1, wherein:
the first database belongs to a central database management system, and
the second database belongs to a plurality of siloed database management systems, each of the siloed database management systems being associated with a different payment service participant.

5. The computer-implemented method of claim 1, wherein the first database uses an LDAP or equivalent technology.

6. The computer-implemented method of claim 1, wherein the hierarchy is a directed acyclic graph.

7. The computer-implemented method of claim 1, wherein the set of payment system data elements include transaction information that describes a transaction conducted by a subordinate payment service participant associated with at least one node that is subordinate to the hierarchy node.

8. The computer-implemented method of claim 1, wherein the set of payment system data elements include loyalty program information that describes a loyalty program offered by a subordinate payment service participant associated with at least one node that is subordinate to the hierarchy node.

9. The computer-implemented method of claim 1, wherein the set of payment system data elements include balance information that describes a balance on an account that is issued by a subordinate payment service participant associated with at least one node that is subordinate to the hierarchy node.

10. The computer-implemented method of claim 1, wherein the user interface includes an account portal having controls for administrating an account of the payment system participant.

11. The computer-implemented method of claim 10, wherein the request for information is initiated at the user interface by an administrator of the payment service participant.

12. The computer-implemented method of claim 10, wherein a number of payment system data element filters displayed on the user interface is inversely related to a number of levels between the level and a level of a hierarch of the hierarchy.

13. The computer-implemented method of claim 1, wherein:
the hierarchy includes at least four levels;
a first level of the hierarchy is a payment system operator level associated with at least one payment system operator;
a second level of the hierarchy is a financial institution network level associated with at least one financial institution network;
a third level of the hierarchy is a financial institution level associated with at least one financial institution belonging to the financial institution network; and
a fourth level of the hierarchy is a merchant level associated with at least one merchant banking with the financial institution.

14. The computer-implemented method of claim 13, further comprising:
traversing the second database to obtain a sibling set of data elements consisting of all payment system data elements located at memory locations associated with each node in the one level of the hierarchy in which the payment system participant is a member; and
providing the sibling set of data elements to the payment system participant as a further response to the request.

* * * * *